(12) United States Patent
Sanders et al.

(10) Patent No.: US 10,720,127 B2
(45) Date of Patent: Jul. 21, 2020

(54) DYNAMIC DISPLAY MODE SELECTION

(71) Applicant: Apple Inc., Cupertino, CA (US)

(72) Inventors: Christopher J. Sanders, San Jose, CA (US); James A. Young, Livermore, CA (US); Jad Osseiran, San Francisco, CA (US); Patrick E. McClaughry, San Jose, CA (US); Jeffrey L. Robbin, Los Altos, CA (US); Craig H. Schamp, Sunnyvale, CA (US); Roger N. Pantos, Scotts Valley, CA (US); Marshall W. Huss, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 107 days.

(21) Appl. No.: 15/994,682

(22) Filed: May 31, 2018

(65) Prior Publication Data

US 2019/0122637 A1    Apr. 25, 2019

Related U.S. Application Data

(60) Provisional application No. 62/576,026, filed on Oct. 23, 2017.

(51) Int. Cl.
| | | |
|---|---|---|
| *G06F 3/0484* | (2013.01) | |
| *G09G 5/14* | (2006.01) | |
| *G06T 1/20* | (2006.01) | |
| *G06F 3/0482* | (2013.01) | |
| *G06F 3/14* | (2006.01) | |
| *G06F 3/147* | (2006.01) | |

(52) U.S. Cl.
CPC .............. *G09G 5/14* (2013.01); *G06F 3/0482* (2013.01); *G06F 3/04842* (2013.01); *G06F 3/147* (2013.01); *G06F 3/1423* (2013.01); *G06T 1/20* (2013.01); *G09G 2320/103* (2013.01); *G09G 2340/0435* (2013.01); *G09G 2340/14* (2013.01); *G09G 2350/00* (2013.01); *G09G 2370/042* (2013.01); *G09G 2370/16* (2013.01)

(58) Field of Classification Search
None
See application file for complete search history.

(56) References Cited

U.S. PATENT DOCUMENTS

| | | | | |
|---|---|---|---|---|
| 7,948,556 | B2* | 5/2011 | Kumakawa | G09G 5/006 348/441 |
| 8,334,857 | B1* | 12/2012 | Ogrinc | G09G 5/377 345/204 |
| 8,812,705 | B1* | 8/2014 | Wang | G06F 16/9537 709/229 |
| 9,508,111 | B1* | 11/2016 | Ogrinc | G09G 5/14 |
| 9,830,880 | B1* | 11/2017 | Wyatt | G09G 5/14 |

(Continued)

*Primary Examiner* — Phong X Nguyen
(74) *Attorney, Agent, or Firm* — Fletcher Yoder PC

(57) ABSTRACT

A content streaming device includes display mode shift logic that selects a display mode among multiple display modes of the content streaming device. The content streaming device also includes region detection logic that determines a region of the content streaming device. The content streaming device further includes one or more processors that communicatively couples to an electronic display. The one or more processors instruct the display mode shift logic to select a first display mode having a first refresh rate based on the region of the content streaming device and supported display modes of the electronic display.

20 Claims, 6 Drawing Sheets

(56) References Cited

U.S. PATENT DOCUMENTS

| | | | |
|---|---|---|---|
| 2002/0000963 A1* | 1/2002 | Yoshida | G09G 3/3611 345/87 |
| 2008/0030615 A1 | 2/2008 | Vasquez et al. | |
| 2008/0100598 A1* | 5/2008 | Juenger | G09G 5/36 345/204 |
| 2008/0165202 A1* | 7/2008 | Brodersen | H04N 21/4122 345/581 |
| 2008/0188210 A1* | 8/2008 | Choi | G04G 9/0076 455/414.3 |
| 2008/0225062 A1* | 9/2008 | Chang | G09G 3/3208 345/691 |
| 2010/0053441 A1* | 3/2010 | Tokashiki | H04N 5/14 348/576 |
| 2010/0060653 A1* | 3/2010 | Courtney, Jr. | G09G 5/18 345/530 |
| 2011/0090324 A1* | 4/2011 | Mentz | H04N 13/341 348/55 |
| 2012/0154559 A1* | 6/2012 | Voss | H04N 13/341 348/55 |
| 2014/0078160 A1* | 3/2014 | Yang | G09G 5/001 345/531 |
| 2015/0302819 A1* | 10/2015 | Weksler | H04N 21/44008 345/611 |
| 2016/0277706 A1* | 9/2016 | Tann | H04N 7/0127 |
| 2016/0345137 A1* | 11/2016 | Ruiz | H04W 4/027 |
| 2017/0140713 A1* | 5/2017 | Liu | G09G 3/2018 |
| 2017/0178588 A1* | 6/2017 | Choi | G09G 3/20 |
| 2018/0136262 A1* | 5/2018 | Rahman | G01R 19/155 |
| 2019/0043435 A1* | 2/2019 | Yang | G09G 3/3618 |

* cited by examiner

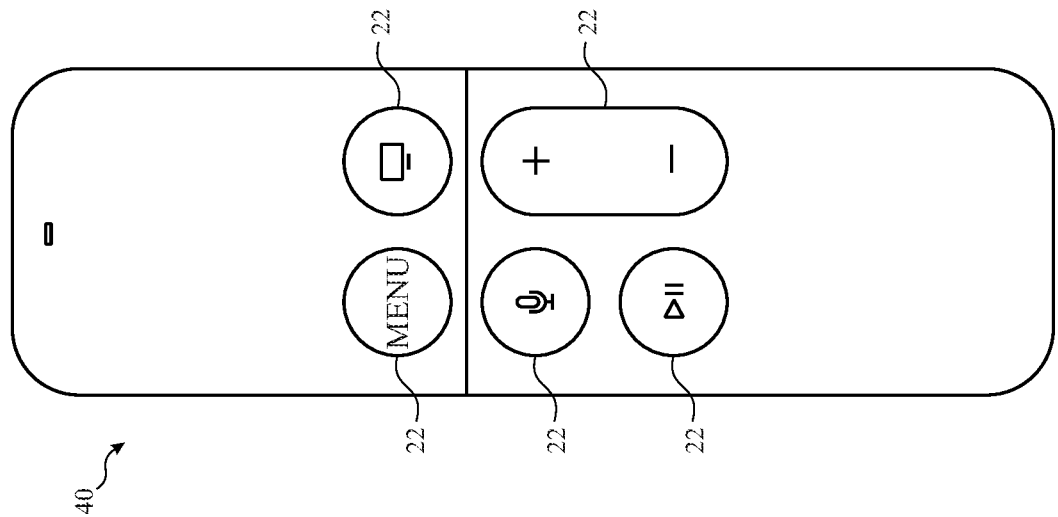
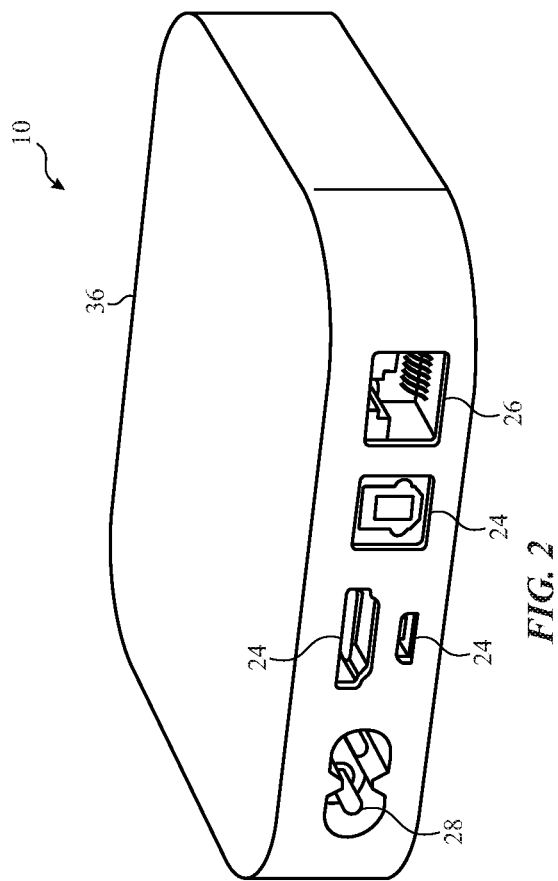

DYNAMIC DISPLAY MODE SELECTION

CROSS-REFERENCE TO RELATED APPLICATION

This application claims priority to U.S. Provisional Patent Application No. 62/576,026, filed Oct. 23, 2017, entitled "Dynamic Display Mode Selection," the contents of which is incorporated by reference in its entirety for all purposes.

BACKGROUND

The present disclosure relates to content streaming circuitry that provide content to an electronic display for display. More specifically, the content streaming circuitry may automatically present the content to the electronic display using a display mode selected based upon a variety of identified factors.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Video content may be broadcast and/or streamed in different formats based on the frequency of the electric power supplied to different regions. For example, in North America, the voltage of the electric power supplied is typically 120 volts (V) and the frequency is typically 60 hertz (Hz). However, in Europe, the voltage of the electric power supplied is typically 230 volts (V) and the frequency is typically 50 hertz (Hz). Older electronic displays (e.g., cathode ray tube-based televisions) would scan video content from top to bottom at a frequency that matched the line voltage, so American and European broadcast standards of 60 Hz and 50 Hz (respectively) were designed to accommodate this. Modern electronic displays (e.g., televisions) may not have such electrical requirements, but the standards remain. As such, electronic displays in North America may typically operate at a refresh rate of 60 Hz, while electronic displays in Europe may typically operate at a refresh rate of 50 Hz. As such, video content in North America may be provided at 60 Hz, while video content in Europe may be provided at 50 Hz.

However, displaying 60 Hz content on an electronic display that operates at 50 Hz, and vice versa, may lead to visual artifacts and playback problems (e.g., content juddering, where the content appears to shake on the display). This may occur when video content that is produced or meant for one region is played on an electronic display that is meant to be operated in another region. For example, playing and/or streaming video content produced in Europe via a content streaming device on an electronic display manufactured for North America may result in visual artifacts and playback problems, because the North American electronic display may render content at 60 Hz, while the content is produced and delivered at 50 Hz.

Moreover, content streaming devices may select an ideal display mode (e.g., a static default configuration mode) that is used regardless of the content, which may include video content, user interfaces, applications, and the like. However, while using the ideal display mode to display all types of content may be convenient or even aesthetically ideal, there may be instances in which the ideal display mode may introduce visual artifacts due to inconsistencies between the content and the electronic display.

For example, movies may typically be filmed at 24 frames per second (fps) and be digitally encoded as such. A content streaming device may connect to an electronic display based on the frequency of the electric power supplied at that region, such as 60 Hz in North America. As such, the content streaming device may convert the movie from 24 fps to a format that may be displayed on most electronic displays in North America (e.g., 60 Hz) based upon a display mode selected by the content streaming device. Some (e.g., more modern) electronic displays may recognize this converted format, and properly display the movie. However, some (e.g., older) electronic displays may not be able to display the converted format properly, and may only display the 24 fps movie format if receiving a 24 Hz signal. Similarly, displaying European programming, which is typically encoded at 50 fps, may introduce undesirable judder when presented at 60 Hz, and vice versa.

As an additional example, a user may prefer to have the electronic display perform certain processing of the content sent by the content streaming device, rather than having the content streaming device perform the processing. For example, the content may be in standard dynamic range (SDR) or high dynamic range (HDR) format. In cases where the content is in SDR format, the content streaming device may automatically convert the content to HDR format. However, such a scenario may be limiting to end users of the content streaming device. For example, the user may prefer to have the electronic display receive the original content in SDR format, and apply its SDR optimization settings to the SDR content (e.g., instead of having the content streaming device automatically convert the content to HDR)

As yet another example, a streaming service or application may separate two portions of content with content of another format. For example, a streaming service may stream episodes of a program, and separate consecutive episodes with at least a portion of a user interface (e.g., that enables a user to advance to the next episode, go back to a menu, etc.). This multi-formatted content may cause rendering issues when treated as content with a single format, as portions of the multi-formatted content may be provided with a format mismatch.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure relates to content streaming devices that provide content to electronic displays for display. In some embodiments, to output content from the content streaming device in a display mode appropriate for a region, the content streaming device may determine whether a user has selected a region using, for example, a menu of displayed via the content streaming device. If so, the content streaming device may select a display mode having a refresh rate based on the region. Additionally and/or alternatively, the content streaming device may determine whether a line frequency that is supplied can be determined. If so, the content streaming device may select a display mode having a refresh rate based on the line frequency. Additionally and/or alternatively, in some embodiments, the content streaming device may determine whether a location may be determined. If so, the content streaming device may select a display mode having a refresh rate based on the location. Otherwise, the content streaming device may select a default display mode.

In additional or alternative embodiments, to output content from the content streaming device in a display mode based on a frame rate of the content, the content streaming device may receive content to output to a display, and then determine whether the frame rate of the content matches a refresh rate supported by the electronic display. The capabilities of the electronic display may be determined and used to determine a particular display mode to use in providing the content. For example, if the electronic display is capable of displaying content at a native frame rate of the content, a first display mode that provides the content at the native frame rate of the content may be used. Otherwise, if the electronic display is not capable of displaying content at the native frame rate (or is known to present content poorly at the native frame rate), the content streaming device may output the content to the electronic display at a frame rate supported by the electronic display. In some embodiments, an opt-in mode may trigger this dynamic selection of refresh rates based upon the native frame rate of the content. For example, when opted-in, the native frame rate may be used for dynamic selection of a display mode, while when opted-out, a static default display mode with a static frame rate may be used.

In further or alternative embodiments, to output content from the content streaming device in a display mode based on a dynamic range of the content, the content streaming device may receive content to output to a display, and then determine whether the content is in a high dynamic range (HDR) format. If so, the content streaming device may output the content to the electronic display in an HDR display mode. Otherwise, when the content is in a standard dynamic range (SDR) format, the content streaming device may determine whether there is an indication to convert SDR content to HDR. If so, the content streaming device may convert the (SDR) content to HDR format, and then output the content to the electronic display. Otherwise, the content streaming device may output the content to the electronic display in SDR format.

Various refinements of the features noted above may be made in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 2 is a perspective view of an electronic content streaming device representing an embodiment of the electronic device of FIG. 1, in accordance with an embodiment;

FIG. 3 is a front view of a remote control of the electronic device of FIG. 1;

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

Figure 1:
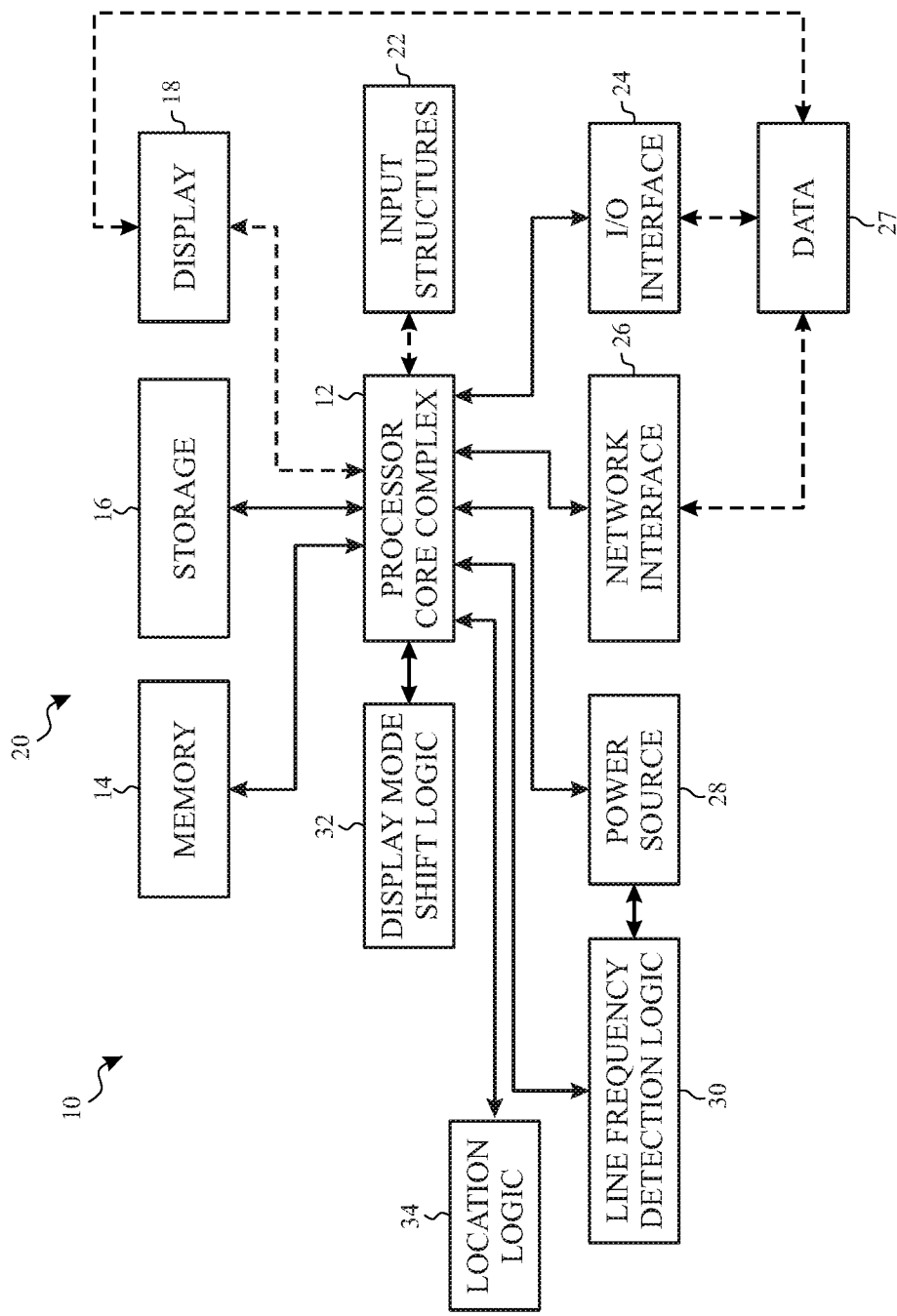
FIG. 1 is a schematic block diagram of an electronic device that includes display mode shift logic, in accordance with an embodiment.

With this in mind, a block diagram of a content streaming device 10 is shown in FIG. 1, according to an embodiment of the present disclosure. As will be described in more detail below, the content streaming device 10 may represent any suitable content streaming device, such as a digital media player, a console, a computer, a mobile phone, a portable media device, a tablet, a television, a wearable electronic device, or the like.

The content streaming device 10 shown in FIG. 1 may include, for example, a processor core complex 12, a local memory 14, a main memory storage device 16, an electronic display 18 (or a connection for communicatively coupling to an external electronic display 18), input structures 22, an input/output (I/O) interface 24, a network interface 26, a power source 28, line frequency detection logic 30, display mode shift logic 32, and location logic 34. The various functional blocks shown in FIG. 1 may include hardware elements (including circuitry), software elements (including machine-executable instructions stored on a tangible, non-transitory medium, such as the local memory 14 or the main memory storage device 16) or a combination of both hardware and software elements. It should be noted that FIG. 1 is merely one example of a particular implementation and is intended to illustrate the types of components that may be present in content streaming device 10. Indeed, the various depicted components may be combined into fewer components or separated into additional components. For example, the local memory 14 and the main memory storage device 16 may be included in a single component.

The processor core complex 12 may carry out a variety of operations of the content streaming device 10. The processor core complex 12 may include any suitable data processing circuitry to perform these operations, such as one or more microprocessors, one or more application specific processors (ASICs), or one or more programmable logic devices (PLDs). In some cases, the processor core complex 12 may execute programs or instructions (e.g., an operating system or application program) stored on a suitable article of manufacture, such as the local memory 14 and/or the main memory storage device 16. In addition to instructions for the processor core complex 12, the local memory 14 and/or the main memory storage device 16 may also store data to be processed by the processor core complex 12. By way of example, the local memory 14 may include random access memory (RAM) and the main memory storage device 16 may include read only memory (ROM), rewritable non-volatile memory such as flash memory, hard drives, optical discs, or the like.

Figure 4:
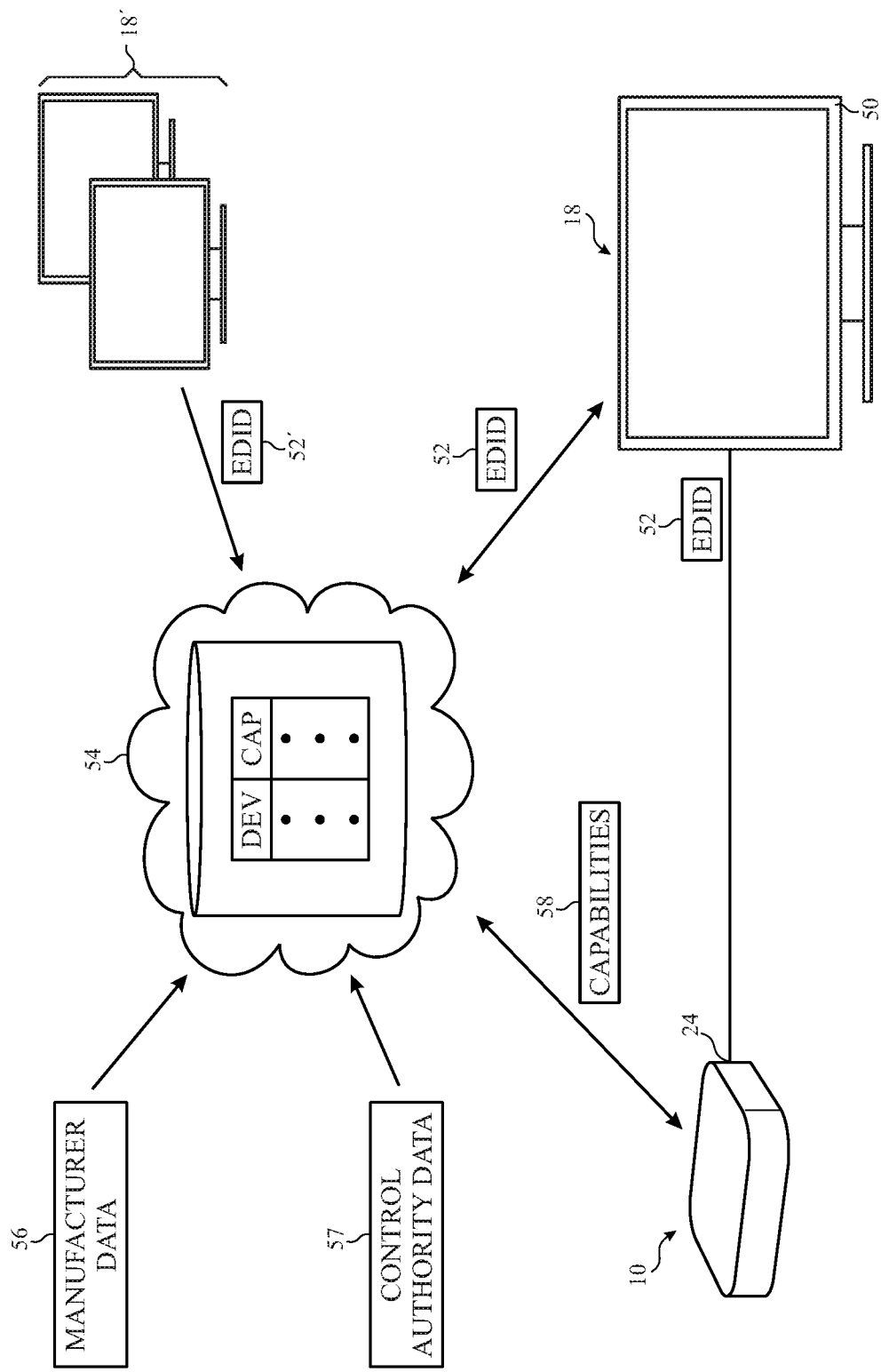
FIG. 4 is a schematic drawing of the content streaming device of FIG. 2, communicatively coupled to an electronic display, in accordance with an embodiment.

As illustrated via a dashed line, in some embodiments, the electronic display 18 may not be part of the content streaming device 10. Instead, the electronic display 18 may be external to the content streaming device 10 and be communicatively coupled to the content streaming device 10 (e.g., via a wired or wireless connection), as shown in FIG. 4. As such, FIG. 1 may represent a system 20 that includes the content streaming device 10 and the electronic display 18. In additional or alternative embodiments, the content streaming device 10 may be incorporated in the electronic display 18, or vice versa, such as in a laptop computer, a tablet computer, a desktop computer with an integrated display 18, etc.

The electronic display 18 may display image frames, such as a graphical user interface (GUI) for an operating system or an application interface, still images, or video content. The processor core complex 12 may supply at least some of the image frames. The electronic display 18 may be a self-emissive display, such as an organic light emitting diodes (OLED) display, a micro-LED display, a micro-OLED type display, or a liquid crystal display (LCD) illuminated by a backlight. In some embodiments, the electronic display 18 may include a touch screen, which may allow users to interact with a user interface of the content streaming device 10.

As illustrated via another dashed line, in some embodiments, the input structures 22 may not be part of the content streaming device 10. Instead, the input structures 22 may be external to the content streaming device 10 and be communicatively coupled to the content streaming device 10 (e.g., via a wired or wireless connection). In additional or alternative embodiments, the content streaming device 10 may include the input structures 22. The input structures 22 of the content streaming device 10 may enable a user to interact with the content streaming device 10 (e.g., pressing a button to increase or decrease a volume level).

The I/O interface 24 may enable the content streaming device 10 to interface with various electronic devices, as may the network interface 26. The I/O interface 24 may include, for example, interfaces for receiving video, audio, or any suitable type of data 27 to facilitate streaming content to the electronic display 18.

The network interface 26 may include, for example, interfaces for a personal area network (PAN), such as a Bluetooth network, for a local area network (LAN) or wireless local area network (WLAN), such as an 802.11x Wi-Fi network, and/or for a wide area network (WAN), such as a cellular network. The network interface 26 may also include interfaces for, for example, broadband fixed wireless access networks (WiMAX), mobile broadband Wireless networks (mobile WiMAX), asynchronous digital subscriber lines (e.g., ADSL, VDSL), digital video broadcasting-terrestrial (DVB-T) and its extension DVB Handheld (DVB-H), ultra-wideband (UWB), alternating current (AC) power lines, and so forth. These interfaces may receive video, audio, or any suitable type of data 27 to facilitate streaming content to the electronic display 18.

The power source 28 may include any suitable source of power, such as a rechargeable lithium polymer (Li-poly) battery and/or an alternating current (AC) power converter coupled to line voltage.

The content streaming device 10 may include line frequency logic 30 that may determine the frequency supplied by the power source 28. For example, the line frequency detection logic 30 may include or be coupled to a voltage sensor that may in turn couple to the power source 28 and determine the amount of voltage supplied by the power source 28. The content streaming device 10 may also include location logic 34 that determines the location of the content streaming device 10. For example, the location logic 34 may use a network (e.g., LAN, WLAN, WAN, and the like) coupled to the content streaming device 10 via the network interface 26 to determine the location of the content streaming device 10.

The content streaming device 10 may include display mode shift logic 32 that enables the processor core complex 12 to change or shift the display mode of the content being output by the content streaming device 10. The display modes may be associated with any suitable parameters related to providing and/or displaying the content, such as refresh rate, frame rate, dynamic range, and the like, and include combinations of the parameters. Refresh rate may refer to the number of times the electronic display 18 updates its buffer, while frame rate may refer to how often the content provides an entire frame of new data to the electronic display 18 (e.g., frames/second). In some instances, the refresh rate may include repeated drawing of identical frames and/or repeated portions of frames. High dynamic range (HDR) content has a dynamic range greater than that of standard dynamic range (SDR) content, which may use a conventional gamma curve. For example, SDR content, when using a conventional gamma curve and a bit depth of 8 bits per sample, has a dynamic range of about 6 stops ($2^6$=64:1). HDR video may have a dynamic range of 200,000:1 or 17.6 stops when displayed on a 2,000 cd/m$^2$ display with a bit depth of 10 bits per sample.

For example, the display modes may include 24 Hz in SDR format, 24 Hz in HDR format, 50 Hz in SDR format, 50 Hz in HDR format, 60 Hz in HDR format, 60 Hz in SDR format, etc. It should be understood that these examples are non-limiting, and any suitable combination of display parameters are contemplated for the display modes.

As will be discussed in more detail below, the display mode shift logic 32 may use characteristics of the data 27, the line frequency detection logic 30, the location logic 34, etc. to select particular display modes to use in presenting the data 27 to the display 18. Additionally, capabilities of the display 18 may be ascertained and used to select the particular display modes. Further, dynamic selection opt-in indicators may be set via the input structures 22 and used to determine the particular display modes In certain embodiments, the content streaming device 10 may take the form of a digital media player, a console, a micro console, a computer, a portable electronic device, a wearable electronic device, or other type of electronic device. For example, the content streaming device 10 may be a model of an Apple TV® available from Apple Inc. The content streaming device 10 is illustrated in FIG. 2, according to an embodiment of the present disclosure. The content streaming device 10 may include a housing or enclosure 36, ports of an I/O interface 24, a port of a network interface 26, and a port for a power source 28.

The content streaming device 10 may provide multiple types of data 27 for display by the electronic display 18. For example, the data 27 may include graphical user interfaces (e.g., for applications ("apps") installed and executed via the content streaming device 10, video content, audio content, screen sharing (e.g., mirroring content), digital images, etc. The data 27, may be streamed (e.g., via the network interface 26 and/or the I/O interface 24), pre-installed (e.g., in the storage 16), or both. As discussed in more detail below, the display mode shift logic 32 of FIG. 1 may be used by the content streaming device 10 to dynamically select display modes to be used to present the data 27 to an electronic display 18 (an external display in the current embodiment).

FIG. 3 depicts a handheld electronic device 40 that includes input structures 22, according to an embodiment of the present disclosure. The handheld electronic device 40 may be communicatively coupled to the content streaming device 10 (e.g., via a wired or wireless connection), and enable a user to control the content streaming device 10. The input structures 22 are illustrated as buttons, but may include any suitable devices, such as dials, a keyboard, a touchpad, a touchscreen, and the like. The input structures 22 may enable a user to control the content streaming device 10, and, as such, correspond to, for example, displaying a menu, changing display modes or parameters, changing volume, initiating vocal instructions, playing content, pausing content, skipping content, rewinding content, control a graphical user interface or application (GUI), navigate a user interface or application interface, and the like. As will be discussed in more detail below, the input structures 22 may be used to control GUI selections for opting-in to dynamic mode selection by the display mode shift logic 32. For example, one opt-in selection may enable dynamic mode selection based upon location (e.g., region), while other opt-in selections may enable dynamic mode selection based upon content formatting, such as a native frame rate of the content and/or a dynamic range (e.g., HDR or SDR) of the content.

FIG. 4 depicts the content streaming device 10 communicatively coupled to the electronic display 18, according to an embodiment of the present disclosure. As illustrated, the electronic display 18 may be coupled to the content streaming device 10 via an I/O interface 24, though in some embodiments, the electronic display 18 may be coupled to the content streaming device 10 via a network interface 26. Moreover, while FIG. 4 illustrates the content streaming device 10 external to the electronic display 18, in some embodiments, the content streaming device 10 may be incorporated in an enclosure or housing 50 of the electronic display 18. For example, such a content streaming device 10 may have direct control over display parameters of the electronic display 18, and perhaps even more than are available over an external connection.

As mentioned above, dynamic display mode selection may be dependent on the capabilities of the attached electronic display 18. For example, when the electronic display 18 is not capable of displaying content at 50 Hz, the content streaming device 10 may restrict selection of a 50 Hz display mode. As discussed herein, electronic display 18 capabilities may be tracked and presented to the content streaming device 10. For example, Extended Display Identification Data (EDID) 52 is a data structure provided by the electronic display 18 that may provide identification data and describe its capabilities to the content streaming device 10. The EDID 52 may also be transmitted to cloud storage 54, which may store an indication of a device and its associated capabilities (e.g., as determined based upon manufacturer data 56, EDID 52, control authority data 57, etc.).

Oftentimes, the provided EDID 52 may be controlled by firmware of the electronic display 18. Accordingly, in certain situations where an electronic display 18 includes outdated firmware, the capabilities of the display 18 may be understated and/or overstated. Accordingly, display 18 capabilities 58 may be sourced from the cloud storage 54, taking into account capabilities described by other similar electronic displays 18' via their EDID 52', via manufacturer provided data 56, and/or via control authority data 57. For example, the manufacturer data 56 may provide an indication that 50 Hz display modes are supported, while outdated firmware results in the EDID 52 indicating that such a mode is not supported. Using the cloud storage 54, the capabilities 58 may override those provided by the EDID 52, resulting in the availability to select 50 Hz display modes. Further, a control authority (e.g., a manufacturer of the content streaming device 10) may provide control authority data 57 indicating that certain modes of a particular electronic display 18 (e.g., 50 Hz mode) do not sufficiently display content according to the control authority's standards. In such scenarios, the control authority data 57 may result in restriction of selection of such modes, despite the EDID 52 and/or the capabilities 58 (e.g., determined based upon EDID 52' and/or manufacturer data 56) indicating that such display modes are supported.

As may be appreciated, each of the embodiments discussed below may select display modes that are compatible with the electronic display 18. Accordingly, each of the below embodiments may perform the capabilities check, discussed herein, prior to/during the selection of a display mode. If the electronic display 18 does not support a proposed display mode and/or insufficiently displays content in the proposed display mode, the proposed display mode may be disabled from selection by the display mode shift logic 32 of the content streaming device 10.

Selecting a Display Mode Based on Region

Displaying content in a format that is mismatched to the electronic display 18 may cause undesirable results. For example, if the content streaming device 10 supplies 60 Hz content on an electronic display 18 that operates at 50 Hz, or vice versa, visual artifacts and playback problems may result. This may occur when playing video content that produced or meant for one region on an electronic display that is meant to be operated in another region. For example, playing and/or streaming video content produced in Europe (which may typically be provided at 50 Hz) via the content streaming device 10 on an electronic display 18 in North America (which may typically operate at a refresh rate of 60 Hz) may result in visual artifacts and playback problems.

In some embodiments, to ensure that the content streamed from the content streaming device 10 is in a proper format for the region that the content streaming device 10 is located, the processor core complex 12 may determine whether a region has been selected. For example, the processor core complex 12 may set (e.g., by default) the region that the content streaming device 10 is located based on using the location logic 34. In alternative or additional embodiments, the processor core complex 12 may prompt a user (e.g., via a user interface) to set the region, or confirm that a region (e.g., selected via the location logic 34) is the correct region. The processor core complex 12 may do so during an initial power up mode, when it receives an indication that the region has changed (e.g., due to moving the content streaming device 10 from one region to another), or the like. In some embodiments, a user may manually change the region that the content streaming device 10 is located (e.g., via a settings menu of the user interface, controlled by the input structures 22 of FIGS. 1 and 3).

Based on the region that the processor core complex 12 has determined the content streaming device 10 is located, the processor core complex 12 may select a display mode to stream content to the electronic display 18. For example, if the processor core complex 12 determines that the region the content streaming device 10 is located in North America, which typically includes electronic displays 18 that operate at a refresh rate of 60 Hz, then the processor core complex 12 may select a display mode that streams content using a 60 Hz refresh rate. Similarly, if the processor core complex 12 determines that the region the content streaming device 10 is located in Europe, which typically includes electronic displays 18 that operate at a refresh rate of 50 Hz, then the processor core complex 12 may select a display mode that streams content using a 50 Hz refresh rate. It should be understood that while examples of North America and Europe are used, these examples are non-limiting, and any suitable region or location and applicable display parameters, voltages, and the like, are contemplated.

As such, the content streaming device 10 may store a table or other suitable data structure of regions and any suitable display parameters associated with the regions to enable selecting display modes that match the display parameters of the regions. The table or suitable data structure may be stored in, for example, the memory 14, the storage 16, or any other suitable medium. In some embodiments, the table or suitable data structure may be stored externally to the content streaming device 10 (e.g., in the cloud) and accessed via the network interface 26.

In some embodiments, the processor core complex 12 may determine a line frequency (e.g., using the line frequency detection logic 30) supplied to the power source 28 of the content streaming device 10. The processor core complex 12 may then select a display mode to stream content to the electronic display 18 based on the line frequency. For example, the processor core complex 12 may determine that the line frequency is 60 Hz (e.g., as with electric power typically supplied in North America). As such, the processor core complex 12 may select a display mode that streams content using a 60 Hz refresh rate. Similarly, if the processor core complex 12 determines that the line frequency is 50 Hz (e.g., as with electric power typically supplied in Europe), the processor core complex 12 may select a display mode that streams content using a 50 Hz refresh rate.

As such, the content streaming device 10 may store a table or other suitable data structure of line frequency values and any suitable display parameters associated with the line frequency values to enable selecting display modes that match the display parameters of the line frequency values. The table or suitable data structure may be stored in, for example, the memory 14, the storage 16, or any other suitable medium. In some embodiments, the table or suitable data structure may be stored externally to the content streaming device 10 (e.g., in the cloud) and accessed via the network interface 26. In additional or alternative embodiments, the processor core complex 12 may associate the line frequency value with a region, and use a table or other suitable data structure of regions and any suitable display parameters associated with the regions to select a display mode that properly displays content on the electronic display 18, or vice versa.

In some embodiments, the processor core complex 12 may determine a location (e.g., using the location logic 34) of the content streaming device 10. The processor core complex 12 may then select a display mode to stream content to the electronic display 18 based on the location of the content streaming device 10. In certain embodiments, location detection may be facilitated by using cellular, Wi-Fi, Global Positioning System (GPS), and/or low-power wireless (e.g., Bluetooth) data of the content streaming device 10 and/or communicatively coupled devices to determine a location of the content streaming device 10. For example, the content streaming device 10 may be coupled to a Wi-Fi network. A GPS-enabled and/or cellular-enabled device (e.g., a cellular smart-phone and/or tablet computer) may also be connected to the Wi-Fi network. The location of the GPS-enabled and/or cellular-enabled device may be determined based upon GPS data and/or cellular triangulation. The location of this device may be transmitted via the Wi-Fi network (or other wireless communication, such as Bluetooth) to the content streaming device 10, where the content streaming device 10 may set its current location as that of the GPS-enabled and/or cellular-enabled electronic device coupled to the same Wi-Fi network. This determined location may be used for display mode selection by the content streaming device 10.

For example, the processor core complex 12 may determine that the location of the content streaming device 10 is North America, which typically includes electronic displays 18 that operate at a refresh rate of 60 Hz. As a result, the processor core complex 12 may select a display mode that streams content using a 60 Hz refresh rate. Similarly, if the processor core complex 12 determines the location is Europe, the processor core complex 12 may select a display mode that streams content using a 50 z refresh rate because the Europe typically includes electronic displays 18 that operate at a refresh rate of 50 Hz.

As such, the content streaming device 10 may store a table or other suitable data structure of locations and any suitable display parameters associated with the locations to enable selecting display modes that match the display parameters of the locations. The table or suitable data structure may be stored in, for example, the memory 14, the storage 16, or any other suitable medium. In some embodiments, the table or suitable data structure may be stored externally to the content streaming device 10 (e.g., in the cloud) and accessed via the network interface 26. In additional or alternative embodiments, the processor core complex 12 may associate the location with a region, and use a table or other suitable data structure of regions and any suitable display parameters associated with the regions to select a display mode that properly displays content on the electronic display 18, or vice versa.

Figure 5:
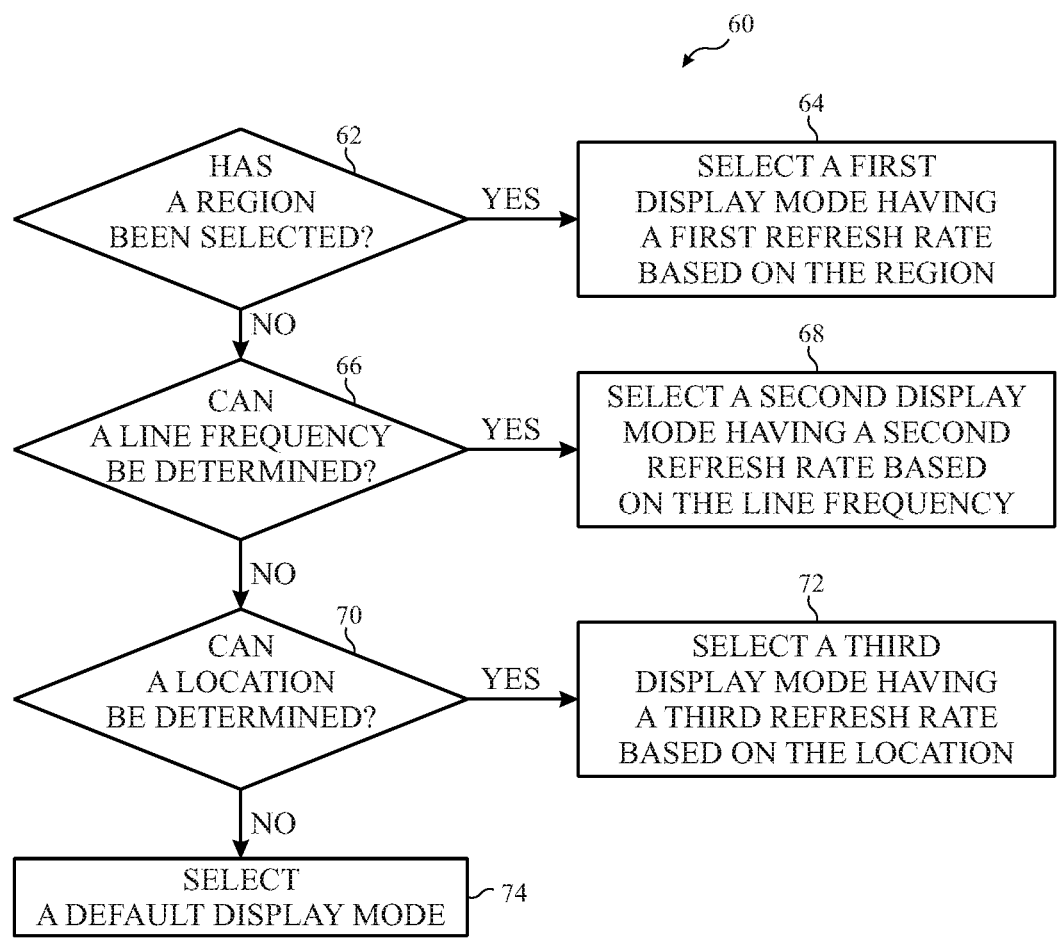
FIG. 5 is a flow diagram, illustrating a process for selecting a display mode of the content streaming device of FIG. 2, in accordance with an embodiment.

It should be understood that any combination and sequence of using any or all of region information, line frequency information, and location information to select a display mode of the content streaming device 10 is contemplated. For example, FIG. 5 is a flow diagram of a process 60 for selecting a display mode of the content streaming device 10 to properly display content on the electronic display 18, according to an embodiment of the present disclosure. The process 60 may be performed by any suitable device or combination of devices that may determine region information, line frequency information, and location information and select display modes. While the process 60 is described using steps in a specific sequence, it should be understood that the present disclosure contemplates that the described steps may be performed in different sequences than the sequence illustrated, and certain described steps may be skipped or not performed altogether. Moreover, while the steps of the process 60 are described below as being performed by the processor core complex 12, it should be understood that the steps of the process 60 may be performed by any suitable device, such as the electronic display 18.

As illustrated, the processor core complex 12 determines (decision block 62) whether a region has been selected. For example, the processor core complex 12 may set (e.g., by default) the region that the content streaming device 10 is located based on using the location logic 34. In alternative or additional embodiments, the processor core complex 12 may prompt a user (e.g., via a user interface) to set the region, or confirm that a region (e.g., selected via the location logic 34) is the correct region. The processor core complex 12 may do so during an initial power up mode, when it receives an indication that the region has changed (e.g., due to moving the content streaming device 10 from one region to another), during period region checks (e.g., daily, weekly, monthly, etc.), or the like. In some embodiments, a user may manually change the region that the content streaming device 10 is located (e.g., via a settings menu of the user interface).

If the region has been selected, the processor core complex 12 selects (process block 64) a first display mode having a first refresh rate based on the region. For example, if the processor core complex 12 determines that the region the content streaming device 10 is located in North America, which typically includes electronic displays 18 that operate at a refresh rate of 60 Hz, then the processor core complex 12 may instruct the display mode shift logic 32 to select a display mode that streams content using a 60 Hz refresh rate. Similarly, if the processor core complex 12 determines that the region the content streaming device 10 is located in Europe, which typically includes electronic displays 18 that operate at a refresh rate of 50 Hz, then the processor core complex 12 may select a display mode that streams content using a 50 Hz refresh rate.

If the region has not been selected, the processor core complex 12 determines (decision block 66) whether a line frequency can be determined. In particular, the processor core complex 12 may instruct the line frequency detection logic 30 to determine a frequency value of the electric power supplied as the power source 28.

If the line frequency can be determined, the processor core complex 12 selects (process block 68) a second display mode having a second refresh rate based on the line frequency. For example, the processor core complex 12 may determine that the line frequency is 60 Hz (e.g., as with electric power typically supplied in North America). As such, the processor core complex 12 may select a display mode that streams content using a 60 Hz refresh rate. Similarly, if the processor core complex 12 determines that the line frequency is 50 Hz (e.g., as with electric power typically supplied in Europe), the processor core complex 12 may instruct the display mode shift logic 32 to select a display mode that streams content using a 50 Hz refresh rate.

If the line frequency cannot be determined, the processor core complex 12 determines (decision block 70) whether a location can be determined. In particular, the processor core complex 12 may instruct the location logic 34 to determine a location of the content streaming device 10 (e.g., via location services, as discussed above).

If the location can be determined, the processor core complex 12 selects (process block 72) a third display mode having a third refresh rate based on the location of the content streaming device 10. For example, the processor core complex 12 may determine that the location of the content streaming device 10 is North America, which typically includes electronic displays 18 that operate at a refresh rate of 60 Hz. As a result, the processor core complex 12 may instruct the display mode shift logic 32 to select a display mode that streams content using a 60 Hz refresh rate. Similarly, if the processor core complex 12 determines the location is Europe, the processor core complex 12 may select a display mode that streams content using a 50 Hz refresh rate because the Europe typically includes electronic displays 18 that operate at a refresh rate of 50 Hz.

If the location cannot be determined, the processor core complex 12 selects (process block 74) a default display mode. In particular, the processor core complex 12 may instruct the display mode shift logic 32 to select the default display mode. In some embodiments, the default display mode may be a display mode set before the content streaming device 10 is shipped to a user. In additional or alternative embodiments, the default display mode may be a lowest performing display mode that may be viewable by a larger number of electronic display 18. In some embodiments, the default display mode may have been confirmed or set by the user as a display mode that enables viewing of content provided by the content streaming device 10.

In some embodiments, before any display mode of the content streaming device 10 is selected, the processor core complex 12 may provide a prompt to a user to confirm that the user desires to change display modes (assuming the display mode will change). In additional or alternative embodiments, the processor core complex 12 may confirm whether the electronic display 18 can properly display the content in the selected display mode. In such embodiments, the content streaming device 10 may store (e.g., in the cloud storage 54, as discussed above) a table or any other suitable data structure that includes information relating to a number of electronic displays 18 and their display capabilities. Such a table or data structure may be stored internally (e.g., in the memory 14 or the storage 16) or externally (e.g., in the cloud and accessed via the network interface 26). In some embodiments, the processor core complex 12 may confirm with the user whether the selected display mode properly display content from the content streaming device 10. For example, the processor core complex 12 may send test content to the electronic display 18 using the selected display mode, and confirm with the user (e.g., via a user interface) whether the test content includes any image artifacts or performance issues.

It should be understood that, in some embodiments, at any suitable time, a user may manually set the refresh rate of the content output by the content streaming device 10. For example, when first setting up the content streaming device 10 (e.g., during an initial power up mode), the user may be prompted (e.g., via a user interface) to set the refresh rate. As another example, the refresh rate may be a setting in a menu provided by a user interface, which the user may navigate to and change. As yet another example, the user may be prompted to select or confirm the refresh rate when the processor core complex 12 determines that the content streaming device 10 has changed locations, received a signal with a different format (e.g., refresh rate), and the like.

In this manner, the processor core complex 12 may ensure that the content streamed from the content streaming device 10 is in a proper format for the region that the content streaming device 10 is located.

Selecting a Display Mode Based on Content

In some cases, it may be desirable for the content streaming device 10 to select a display mode based on the format or display parameters of the content. For example, the content streaming device 10 may convert content based on the region that the content streaming device 10 is located. However, in some instances, some (e.g., older) electronic displays may not be able to display the converted format properly. As an example, movies may typically be filmed at 24 frames per second (fps) and be digitally encoded as such. The content streaming device 10 may output movie content to an electronic display 18 based on the frequency of the electric power supplied at that region, such as 60 Hz in North America. As such, the content streaming device 10 may convert the movie from 24 fps to a format that may be displayed on typical electronic displays in North America (e.g., 60 Hz). Such older electronic displays may not be able to display the converted format properly, and may only display the 24 fps movie format if receiving a 24 Hz signal. Similarly, displaying European programming, which is typically encoded at 50 fps, may introduce undesirable judder when presented at 60 Hz, and vice versa.

In some embodiments, to ensure that the content streamed from the content streaming device 10 is in a proper format based on the content, the processor core complex 12 may determine whether a frame rate of the content matches a refresh rate of the electronic display 18. In particular, the processor core complex 12 may determine certain properties of the data 27 received via the I/O interface 24 or the network interface 26, including a frame rate of the data 27. The processor core complex 12 may also determine certain properties of the electronic display 18, such as a refresh rate. As discussed above, in some embodiments, the processor core complex 12 may determine identification information (e.g., Extended Display Identification Data (EDID) 52 of FIG. 4) of the electronic display 18, and determine certain properties of the electronic display 18 based on the identification information. For example, the content streaming device 10 may store a table or any other suitable data structure that includes information relating to a number of electronic displays 18 and their display capabilities, including the identification information and the refresh rate. Such a table or data structure may be stored internally (e.g., in the memory 14 or the storage 16) or externally (e.g., in the cloud storage 54 and accessed via the network interface 26).

The processor core complex 12 may determine that the frame rate of the content matches the refresh rate of the electronic display 18 when the frame rate of the content is approximately equal to the refresh rate of the electronic display 18. For example, if the frame rate of the data 27 is approximately 60 fps and the refresh rate of the electronic display 18 is approximately 60 Hz, then the processor core complex 12 may determine that the frame rate of the content matches the refresh rate of the electronic display 18. However, if the frame rate of the data 27 is approximately 50 fps and the refresh rate of the electronic display 18 is approximately 60 Hz, then the processor core complex 12 may determine that the frame rate of the content does not match the refresh rate of the electronic display 18. As such, the processor core complex 12 may apply a threshold (e.g., within 2-5 fps) in determining when the frame rate of the content matches the refresh rate of the electronic display 18.

If the frame rate of the content does not match the refresh rate of the electronic display 18, the content streaming device 10 may convert the content to match the refresh rate of the electronic display 18. For example, if the refresh rate of the electronic display 18 is 50 Hz, then the content streaming device 10 may be operating in a display mode that streams content to the electronic display 18 using a 50 Hz signal. If the frame rate of the content to be streamed to the electronic display 18 is 25 fps (as may be typical for phase alternating line (PAL) encoded video), the content streaming device 10 may convert the content by displaying each frame twice such that the frame rate (now 50 fps) matches the refresh rate of the electronic display 18. The content streaming device 10 may then output this converted content—without changing the display mode of the content streaming device 10 (such that the content still streams the content to the electronic display 18 using a 50 Hz signal).

In some embodiments, if the frame rate of the content matches a supported refresh rate of the electronic display 18, the processor core complex 12 may determine whether a refresh rate of the current display mode of the content streaming device 10 is the same as the refresh rate of the electronic display 18. If so, then the frame rate of the content matches both the refresh rate of the current display mode and the refresh rate of the electronic display 18, and the content streaming device 10 may output the content (e.g., natively or without conversion) to the electronic display 18. Again, changing the display mode of the content streaming device 10 is unnecessary as the frame rate of the content matches both the refresh rate of the current display mode and the refresh rate of the electronic display 18.

In some embodiments, if the frame rate of the content matches a supported refresh rate of the electronic display 18, but not the refresh rate of the current display mode of the content streaming device 10, then the processor core complex 12 may change the current display mode to a display mode that has a refresh rate that is the same as the refresh rate of the electronic display 18. This is because there is no need for this intermediate conversion by the content streaming device 10, since the frame rate of the content already matches a supported refresh rate of the electronic display 18. Indeed, converting the content to another format (e.g., one with a non-matching refresh rate) may result in undesirable viewing results. For example, to convert content encoded at 24 fps to a 60 Hz refresh rate may include display a first frame three times, and a second frame two times, and so on. As a result, viewing the converted content may be suboptimal.

However, in some cases, a streaming service or application displayed on the electronic display 18 via the content streaming device 10 may separate two portions of content having a common format with content of another format. For example, a streaming service may stream episodes of a program which are encoded at 24 fps, and separate consecutive episodes with at least a portion of a user interface (e.g., that enables a user to advance to the next episode, go back to a menu, etc.) for a target time encoded at 120 fps. While it may be aesthetically ideal with respect to the content to display the episodes at 24 fps and the user interface at 120 fps, it may result in a less than desirable user experience. In particular, it may a certain amount of time (e.g., 2-6 seconds) to switch between a first display mode having a refresh rate of 24 Hz and a second display mode having a refresh rate of 120 Hz. Similarly, it may a certain amount of time (e.g., 2-6 seconds) to switch between a third display mode that displays SDR content and a fourth display mode that display HDR content. As such, a user may experience screen flicker or blackness for the certain amount of time for the content streaming device 10 to change display modes, and could even miss the portion of the user interface altogether.

As such, in some embodiments, the processor core complex 12 may receive an indication (e.g., as programmed into the content) not to change display modes of the content streaming device 10 to not detract from the user experience. For example, application developers may provide an explicit indication in the application to not change display modes when a portion of the user interface may be shown for less than certain time threshold (e.g., 0-20 seconds, 0-120 seconds, and the like), such as when the portion of the user interface is shown in between two consecutive episodes.

Figure 6:
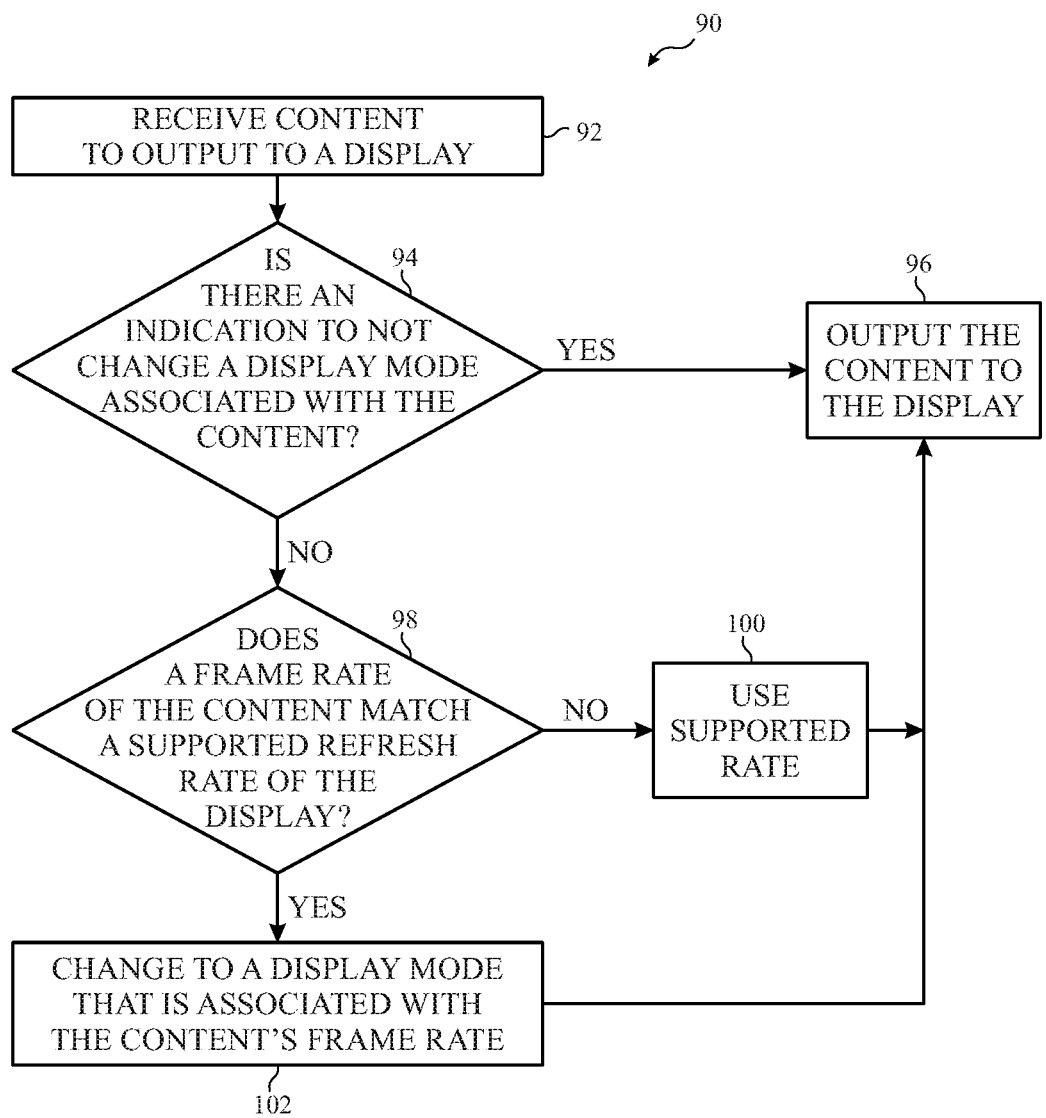
FIG. 6 is a flow diagram, illustrating a process for selecting a display mode based on the frame rate of the content, in accordance with an embodiment.

FIG. 6 is a flow diagram of a process 90 for selecting a display mode based on the frame rate of the content, according to an embodiment of the present disclosure. The process 90 may be performed by any suitable device or combination of devices that may determine the frame rate of the content, determine the refresh rate of the electronic display 18, determine the refresh rate of a display mode of the content streaming device 10, and change the display mode of the content streaming device 10. While the process 90 is described using steps in a specific sequence, it should be understood that the present disclosure contemplates that the described steps may be performed in different sequences than the sequence illustrated, and certain described steps may be skipped or not performed altogether. Moreover, while the steps of the process 90 are described below as being performed by the processor core complex 12, it should be understood that the steps of the process 90 may be performed by any suitable device, such as the electronic display 18.

As illustrated, the processor core complex 12 receives (process block 92) content to output to the electronic display 18. For example, the content may be a portion of the data 27 received via the I/O interface 24 and/or the network interface 26.

The processor core complex 12 then determines (decision block 94) whether there is an indication to not change a display mode associated with the content. For example, application developers may provide the indication in the user interface to not change display modes when a portion of the user interface may be shown for less than certain time threshold (e.g., 0-20 seconds, 0-120 seconds, and the like), such as when the portion of the user interface is shown in between two consecutive episodes. If there is such an indication, the processor core complex 12 outputs (process block 96) the content to the electronic display 18 (without changing the display mode based upon a frame rate of the content).

If there is not such an indication, the processor core complex 12 determines (decision block 98) whether a frame rate of the content matches a supported refresh rate of the electronic display 18. In particular, the processor core complex 12 may determine that the frame rate of the content matches a supported refresh rate of the electronic display 18 when the frame rate of the content is approximately equal to the refresh rate of the electronic display 18 (e.g., as defined by the capabilities 58 of FIG. 4). If the frame rate of the content does not match a supported refresh rate of the electronic display 18, the processor core complex 12 may convert the content to match a supported refresh rate of the electronic display 18 (e.g., that matches a default frame rate of the content streaming device 10 and/or that is closest to the frame rate of the content, etc.) (process block 100). The processor core complex 12 then outputs (process block 96) the content to the electronic display 18.

If the processor core complex 12 determines that the frame rate of the content matches a supported refresh rate of the electronic display 18, the processor core complex 12 selects a display mode that is associated with the frame rate of the content. For example, when 50 Hz content is supported by the electronic display, a 50 Hz display mode is selected for 50 Hz content. The content is then output to the display 18 (block 96).

In some circumstances, a user may prefer to have the electronic display 18 perform certain processing of the content sent by the content streaming device 10, rather than having the content streaming device 10 perform the processing. For example, the data 27 received by the content streaming device 10 may be in SDR format, which the content streaming device 10 may automatically convert to HDR format. However, the user may prefer to have the electronic display 18 receive the original content in SDR format, and apply its SDR optimization settings to the SDR content (e.g., instead of having the content streaming device automatically convert the content to HDR).

In particular, the processor core complex 12 may determine certain properties of the data 27 received via the I/O interface 24 or the network interface 26, including a dynamic range (e.g., SDR or HDR) of the data 27. The processor core complex 12 may also determine whether there is an indication to not have the content streaming device 10 convert SDR content to HDR. For example, the user may be prompted (e.g., during an initial power up mode) as to whether the content streaming device 10 should convert SDR content to HDR. The content streaming device 10 may also enable the user to manually select whether the content streaming device 10 converts SDR content (e.g., via a setting menu of a user interface). As such, the processor core complex 12 may convert SDR content to HDR by default and/or when the user confirms that the content streaming device 10 should do so.

Figure 7:
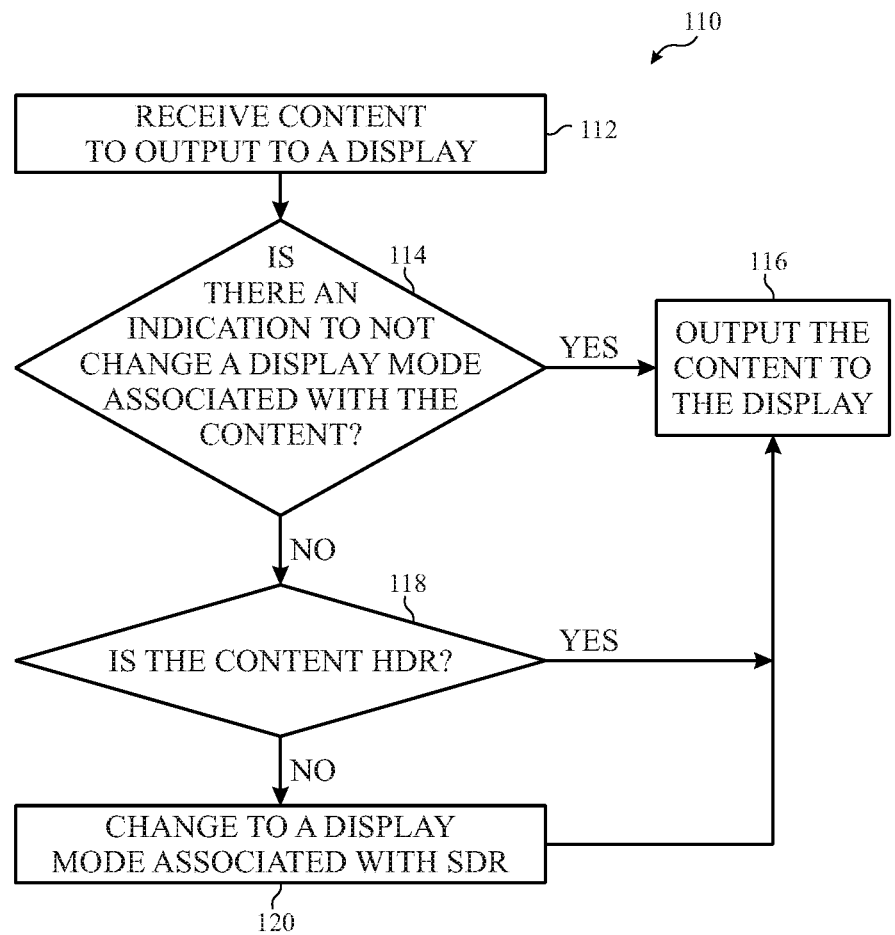
FIG. 7 is a flow diagram, illustrating a process for selecting a display mode based on the dynamic range of the content, in accordance with an embodiment.

FIG. 7 is a flow diagram of a process 110 for selecting a display mode based on the dynamic range of the content, according to an embodiment of the present disclosure. The process 110 may be performed by any suitable device or combination of devices that may determine the dynamic range of the content and convert SDR content to HDR. While the process 110 is described using steps in a specific sequence, it should be understood that the present disclosure contemplates that the described steps may be performed in different sequences than the sequence illustrated, and certain described steps may be skipped or not performed altogether. Moreover, while the steps of the process 110 are described below as being performed by the processor core complex 12, it should be understood that the steps of the process 110 may be performed by any suitable device, such as the electronic display 18.

Assuming that the content streaming device 10 has been streaming (native) HDR content to the electronic display 18, the processor core complex 12 receives (process block 112) content to output to the electronic display 18. For example, the content may be a portion of the data 27 received via the I/O interface 24 and/or the network interface 26.

The processor core complex 12 then determines (decision block 114) whether there is an indication to not change a display mode associated with the content. For example, application developers and/or end users may provide the indication in the user interface to not change display modes. For example, a developer may indicate not to dynamically shift display modes when a portion of the user interface may be shown for less than certain time threshold (e.g., 0-20 seconds, 0-120 seconds, and the like), such as when the portion of the user interface is shown in between two consecutive episodes. An end user may indicate not to dynamically shift display modes when the user desires downstream components to handle HDR/SDR settings. If there is such an indication, the processor core complex 12 outputs (process block 116) the content to the electronic display 18 (without changing the display mode). Accordingly, both HDR and SDR content may be provided in a default display mode (e.g., HDR mode). The HDR may be the default display mode, as SDR content may typically be handled as a subset of HDR.

If there is not such an indication, the processor core complex 12 determines (decision block 118) whether the content is in HDR format. If so, the processor core complex 12 outputs (process block 116) the content to the electronic display 18 (without changing the display mode of the content streaming device 10). This is because the content streaming device 10 is already in a display mode that is streaming in HDR format. In embodiments, where HDR is not the default display mode, an HDR display mode may first be selected prior to outputting the content.

If the content is not in HDR format (and the default display mode is HDR), the processor core complex 12 changes (process block 120) to a display mode associated with SDR. In particular, the processor core complex 12 may instruct the display mode shift logic 32 to change to a display mode that streams content to the electronic display 18 in SDR format. The processor core complex 12 then outputs (process block 116) the SDR content to the electronic display 18.

In some embodiments, before any display mode of the content streaming device 10 is selected, the processor core complex 12 may provide a prompt to a user to confirm that the user desires to change display modes (assuming the display mode will change). In additional or alternative embodiments, the processor core complex 12 may confirm whether the electronic display 18 can properly display the content in the selected display mode. In such embodiments, the content streaming device 10 may store a table or any other suitable data structure that includes information relating to a number of electronic displays 18 and their display capabilities. Such a table or data structure may be stored internally (e.g., in the memory 14 or the storage 16) or externally (e.g., in the cloud and accessed via the network interface 26). In some embodiments, the processor core complex 12 may confirm with the user whether the selected display mode properly display content from the content streaming device 10. For example, the processor core complex 12 may send test content to the electronic display 18 using the selected display mode, and confirm with the user (e.g., via a user interface) whether the test content includes any image artifacts or performance issues. In this manner, the processor core complex 12 may select a preferred display mode based on the dynamic range of the content.

Figure 8:
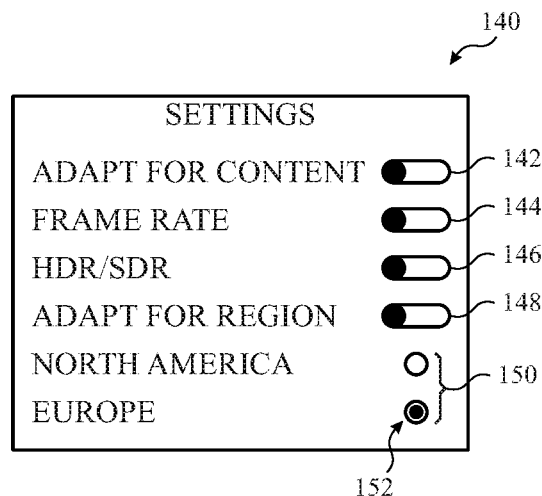
FIG. 8 is a schematic diagram of a graphical user interface (GUI) for enabling dynamic selection of display modes based upon region and/or content, in accordance with an embodiment.

FIG. 8 is a schematic diagram of a graphical user interface (GUI) 140 for opting-in to dynamic selection of display modes based upon region and/or content, in accordance with an embodiment. Option 142 allows the user to select whether or not to select display modes based upon content. When enabled, sub-options 144 and 146 provide selectors for determining whether to select display modes based upon a content's frame rate (option 144) and/or HDR/SDR settings (option 146). For example, if European content (e.g., 50 fps content) is received and option 144 is enabled, a 50 Hz mode may be selected by the display mode shift logic 32. When option 146 is selected, SDR content will be provided in an SDR format, while HDR content is proved in an HDR format.

In some embodiments, a developer (e.g., of a content streaming application being executed on the content streaming device 10) and/or user may disable option 142 to avoid complications (e.g., delays) resulting from switching display modes for different format types in multi-formatted content. For example, a sports content provider may alternate between two games delivered in different formats (e.g., refresh rates, dynamic ranges, and the like). The developer and/or user may prefer that the electronic display 18 does not switch back and forth repeatedly between the display modes used to display the different formats. Similarly, if the user is watching a playlist of short videos, the user may not be able to view, for example, five seconds of a fifteen second video due to changing display modes. As such, the developer and/or user may disable option 142 to avoid such suboptimal viewing experiences.

If option 142 is disabled, display modes may not be selected based upon frame rate and/or HDR/SDR formatting of the content, but instead may be determined based upon region (e.g., when option 148 is enabled to adapt display modes for a detected region) or may use a default display mode (e.g., 60 Hz, HDR).

As mentioned above, option 148, when enabled, may select a display mode based upon a determined region. Options 150 provide a selector for a region, which may be modified by a user. In the current embodiment, the Europe region selector 152 is provided as a default. As mentioned herein, a default selection may be provided via the GUI based upon other information, such as a line frequency provided to the content streaming device, location services of the content streaming device, or both.

While the current embodiment illustrates a GUI 140 that provides opt-in prompts for a settings menu, similar prompts may be provided during an initial startup/setup of the content streaming device. For example, during the initial setup process, a region selector may provide options, such as options 148 and 150, along with a default selection (e.g., as shown by selected Europe region selector 152). Additionally and/or alternatively, options 142, 144, and/or 148 may be provided via an initial setup screen of the initial setup process.

Using the techniques provided herein may result in a highly customizable content viewing experience that greatly enhances traditional content viewing experiences. For one, content juddering and/or other artifacts may be avoided by matching an output display mode of a content streaming device to a region and/or content format. Further, quality control may be implemented by allowing the addition or removal of supported display modes over those indicated as supportable by a particular electronic display. For example, manufacturer data and/or control authority data may provide supplemental information related to supported display modes that may dynamically alter selectable display modes of the content streaming device. This may result in increased flexibility of display mode selection, while ensuring that quality control standards of the control authority are met, resulting in increased quality in content presentation.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A content streaming device comprising:
    display mode shift circuitry configured to select a display mode among a plurality of display modes of the content streaming device;
    region detection circuitry configured to determine a region of the content streaming device by:
        first, a user indication of the region, when provided; and
        second, a line frequency provided to the content streaming device, a detected location of the content streaming device, or both, when the user indication is not provided; and
    one or more processors configured to:
        communicatively couple to an electronic display and determine a set of supported refresh rates of the electronic display; and
        instruct the display mode shift circuitry to select a first display mode having a first refresh rate based at least in part on the region of the content streaming device and the set of supported refresh rates of the electronic display.

2. The content streaming device of claim 1, wherein the region detection circuitry comprises machine-readable instructions that cause the one or more processors to determine the region of the content streaming device by:
    presenting a graphical user interface that provides a region selection prompt; and
    receiving a region selection via the region selection prompt; and
    determining the region based upon the region selection.

3. The content streaming device of claim 2, wherein the region is determined by the region detection circuitry at an initial power up of the content streaming device.

4. The content streaming device of claim 1, wherein the region detection circuitry comprises line frequency detection circuitry configured to determine the line frequency, wherein when the line frequency comprises 50 hertz (Hz), the region is set to a first region known to use 50 Hz signals and when the line frequency comprises 60 Hz, the region is set to a second region known to use 60 Hz signals.

5. The content streaming device of claim 4, wherein the region detection circuitry comprises machine-readable instructions that cause the one or more processors to determine the region of the content streaming device by:
    providing a graphical user interface that provides a region selection prompt; and
    wherein the region detection circuitry is configured to select the region:
        first based upon a received selection input via the region selection prompt; and
        second based upon the line frequency, only when no selection input is received in response to the region selection prompt.

6. The content streaming device of claim 1, wherein the region detection circuitry comprises location services configured to determine a location of the content streaming device using wireless network signals, global positioning system (GPS) signals, or both, wherein the region is selected based at least in part on the location.

7. The content streaming device of claim 6, wherein the location services are configured to receive the wireless network signals, the GPS signals, or both, via other electronic devices communicatively coupled to a common Wi-Fi network of the content streaming device.

8. The content streaming device of claim 7, wherein the region detection circuitry is configured to determine the region based upon:
    first, an explicit selection input of the region received in response to a region selection prompt provided by a GUI of the content streaming device; and
    second, the location services, when no explicit selection input is received in response to the region selection prompt.

9. The content streaming device of claim 8, wherein the region detection circuitry is configured to determine the region based at least in part upon a detected line frequency provided to the content streaming device.

10. The content streaming device of claim 1, wherein the one or more processors are configured to confirm whether to change the display mode by:
    verifying capabilities of the electronic display using capability data for the electronic display that is provided from a capability data store, Extended Display Identification Data (EDID) received from the electronic display, or both;
    presenting a test display signal after selecting the first display mode; or
    both.

11. A method comprising:
    determining, via region detection circuitry of a content streaming device, a region of the content streaming device by:
        first, a user indication of the region, when provided; and
        second, a line frequency provided to the content streaming device, a detected location of the content streaming device, or both, when the user indication is not provided;
    receiving, via processing circuitry of the content streaming device, compatibility data comprising supported display modes of an electronic display communicatively coupled to the content streaming device; and
    selecting, via display mode shift circuitry of the content streaming device, a first display mode among a plurality of display modes of the content streaming device, the first display mode having a first refresh rate based at least in part on the region of the content streaming device and the compatibility data.

12. The method of claim 11, comprising providing a graphical user interface (GUI) that prompts for an explicit selection of the region via the GUI.

13. The method of claim 12, comprising providing the GUI upon an initial startup of the content streaming device.

14. The method of claim 12, comprising provide the GUI via a settings menu of the content streaming device.

15. The method of claim 12, comprising providing a default selection of the region in the GUI, based upon determining the region based upon:
   a line frequency supplied to the content streaming device,
   received wireless network signals, GPS signals, or both, from other electronic devices communicatively coupled to a common Wi-Fi network of the content streaming device, or
   both.

16. The method of claim 11, wherein the compatibility data comprises an indication of whether at least one display mode of the electronic display meets display quality criteria of a control authority; and
   wherein the method comprises skipping, via the display mode shift circuitry, selection of the at least one display mode, when the at least one display mode does not meet the display quality criteria.

17. The method of claim 11, wherein the compatibility data comprises an indication of at least one display mode of the electronic display outside of display modes provided by an Extended Display Identification Data (EDID) of the content streaming device; and
   wherein the method comprises enabling the display mode shift circuitry to select the at least one display mode.

18. A tangible, non-transitory, machine-readable medium, comprising machine-readable instructions, that when executed by processing circuitry, cause the processing circuitry to:
   determine a region of a content streaming device by:
      first, a user indication of the region, when provided; and
      second, a line frequency provided to the content streaming device, a detected location of the content streaming device, or both, when the user indication is not provided; and
   determine a set of supported refresh rates of an electronic display; and
   select a first display mode having a first refresh rate, from a set of available refresh rates of the content streaming device, based at least in part on the region of the content streaming device and the set of supported refresh rates of the electronic display.

19. The machine-readable medium of claim 18, comprising instructions to cause the processing circuitry to determine the region of the content streaming device:
   first, using an explicit region selection from a graphical user interface (GUI) of the content streaming device, when available, the GUI provided at an initial startup of the content streaming device, a settings menu of the content streaming device, or both; and
   otherwise, using:
      a line frequency supplied to the content streaming device;
      received wireless network signals, GPS signals, or both, from other electronic devices communicatively coupled to a common Wi-Fi network of the content streaming device; or both; or
      a combination thereof.

20. The machine-readable medium of claim 18, comprising instructions to cause the processing circuitry to select a default display mode when the region cannot be determined.

* * * * *